United States Patent [19]

Schindl

[11] Patent Number: 4,597,644

[45] Date of Patent: Jul. 1, 1986

[54] INCLINABLE MICROSCOPE BODY

[75] Inventor: Klaus P. Schindl, Vienna, Austria

[73] Assignee: C. Reichert Optische Werke AG, Vienna, Austria

[21] Appl. No.: 652,796

[22] Filed: Sep. 21, 1984

[30] Foreign Application Priority Data

Sep. 24, 1983 [DE] Fed. Rep. of Germany ....... 3334691

[51] Int. Cl.⁴ ...................... G02B 21/18; G02B 21/20
[52] U.S. Cl. ..................................... 350/511; 350/514
[58] Field of Search ............................... 350/511–517, 350/520, 522, 539, 550–558, 569, 571

[56]    References Cited
FOREIGN PATENT DOCUMENTS

3117858  1/1982  Fed. Rep. of Germany ...... 350/515

Primary Examiner—William H. Punter
Attorney, Agent, or Firm—Alan H. Spencer

[57]    ABSTRACT

In a microscope possessing an adjustable-inclination viewing tube and optical path system for erecting the image, an optical component forming part of the erecting system can be interchanged with another optical component. It is thus possible to select, at will, either a totally reflecting optical component, or an optical component which splits the beam into two, the latter optical component being usable for the purpose of attaching the microscope to a photographic device or similar accessory.

4 Claims, 12 Drawing Figures

INCLINABLE MICROSCOPE BODY

The invention relates to a microscope having an objective, a viewing tube and an optical path system for erecting the image, this optical path system comprising first and second optical components for deflecting the light beam and an optical bridge between the exit optical axis of the first optical component and the entry optical axis of the second optical component. These optical components are rotatable about parallel axes and, starting from the normal initial positions of the components about their respective axes relative to the optical bridge, the angle of the first optical component about its exit optical axis is equal to the angle of the second optical component about is entry optical axis, but in the opposite sense to this angle, while the entry optical axis of the first optical component coincides with the optical axis of the microscope objective.

A microscope of the foregoing type has, for example, been disclosed in German Offenlegungsschrift No. 2,502,209. In this microscope, the binocular unit can be pivoted in order to alter the viewing angle, to which end the optical components are rotatable about their respective axes. These optical components take the form of half-cube prisms and are aligned, in their normal initial positions, such that the entry optical axis of the first optical component is colinear with the exit optical axis of the second optical component, but counter to this axis, and the optical bridge is composed of a half-cube prism and a pentagonal prism of the roof-edge type, so that the image is rotated once through 180°. By this means, the observer does not see the observed object upside-down, and the image is prevented from rotating when the binocular unit is pivoted, so that the orientation of the displacement of the image which is observed in the microscope is the same as the orientation of the manipulations performed on the object. As a result, it is comfortable to work with a microscope of this type.

In the case of the microscope disclosed in German Offenlegungsschrift No. 2,502,209, no provision is made for the attachment of a photographic device or similar accessory, such as, for example, a television camera, a cine camera, or a projection screen. However, microscopes are known which embody image-erection, but which do not have pivotable viewing tubes, and in such microscopes a Bauernfeind prism is used in order to divert the object beam into the viewing tube. The object beam generally passes vertically upwards into the viewing tube. The Bauernfeind prism can either divert the whole of the object beam, so that 100 percent of the light from the object enters the viewing tube, or it can be designed as a splitting prism, so that, for example, only 80 percent of the light from the object is diverted into the viewing tube for the purpose of direct observation, while 20 percent of the light is allowed through, in the upward direction, without being reflected by the splitting prism, and enters a photographic device, or a similar device, which is attached in order to make a photographic recording. The ratio of the amounts of light for viewing and photography can also be 20:80, or even 0:100 in the case of particularly dull objects. At the same time, it is known to install two different Bauernfeind prisms on a slide which can be moved horizontally, in order to be able to push one or other of the Bauernfeind prisms into the optical path of the microscope at will. The space required for this arrangement amounts to at least three prism-widths, namely one additional prism-width to the left and one to the right of the working position of a prism in the optical path of the microscope.

If it is now desired to permit the attachment of additional optical recording systems, such as, for example, a photographic device, to a microscope with image-erection and a tiltable viewing tube, so that the proportions of light entering the viewing tube and entering the photographic device can be selected, problems are encountered. If the prisms are to be interchanged in order to select the proportions of light passing to the viewing and to the photographic systems, only the first optical component of the erecting path system can, in fact, be considered in the case of a microscope of the type initially described herein, since this optical component is not rotated when the viewing tube is tilted. However, when microscope objectives which are corrected for infinity are used, the tube lens approaches the first optical component very closely from below; while the second optical component is located laterally of the optical bridge which can be pivoted about the first optical component and, in its turn, can be pivoted together with the viewing tube about the optical bridge. It is thus impossible to interchange the first optical component in the manner which has been described above in the context of a microscope which does not have a tiltable viewing tube, and which functions with the aid of a Bauernfeind prism. Where alternative first optical components are to be interchanged, there is admittedly sufficient space available for the replacement component on one side of the component that is already in position, but there is no space for the original first optical component to be pushed out on the opposite side.

OBJECT OF THE INVENTION

The object underlying the invention is to provide a microscope of the type first mentioned, possessing image-erection and a tiltable viewing tube, which is suitable for the attachment of additional optical systems, such as, for example, a photographic device, in which it is possible to select the relative proportions of light entering the viewing system and the additional optical system.

SUMMARY OF THE INVENTION

The object is achieved in a microscope of the type first mentioned, according to the invention, by providing a holder which can be pivoted about an axis of rotation, this axis of rotation being located in the space extending away from the microscope objective and the second optical component, parallel to the exit optical axis of the first optical component and at a distance from this axis, on which holder at least two first optical components are fastened, at the same distance from the axis of rotation, at least one of these first optical components being an optical splitter which splits the incoming light beam into a beam which is reflected into the viewing tube, and into a beam which is not reflected, but passes through, and enters a further optical system.

The first optical components which are to be interchanged move, according to the invention, on an arc of a circle, so that there is no longer any need for space equivalent to a full prism-width to be present on both sides of the first optical component which is to be replaced.

Moreover, the solution according to the invention can be implemented even more easily if the optical path system for erecting the image is configured in the manner disclosed in German Patent Application 3,222,935, filed June 18, 1982 (U.S. Ser. No. 504,773 filed June 6, 1983 and now abandoned). In this case, in the normal initial position, the entry optical axis of the first optical component, on one side of the optical bridge, is perpendicular to the optical axis of the bridge, and the exit optical axis of the second optical component, on the opposite side of the optical bridge, is likewise perpendicular to the optical axis of the bridge. In contrast to the optical bridge disclosed in German Offenlegungsschrift No. 2,502,209, four reflections are not necessary in an optical erecting system of this type, but only two, and i is possible to provide for these two reflections by employing, for example, only two half-cube prisms, in order to obtain an inversion of the image between the entry and exit points of the optical erecting system. Moreover, the optical components invariably consist of prisms, for preference, although mirrors can also be considered. As a result, the space required for the microscope as a whole is also reduced.

BRIEF DESCRIPTION OF THE DRAWINGS

Further advantages, details, and features of the invention are evident from the description which follows, which refers to the accompanying drawings.

FIGS. 9a and 9b show two mutually perpendicular sections through a portion of a specific illustrative embodiment of a microscope according to the invention, the components of the microscope which are not absolutely necessary for the explanation being omitted for the sake of clarity, especially in FIG. 9a.

DETAILED DESCRIPTION OF THE INVENTION

Figure 1:
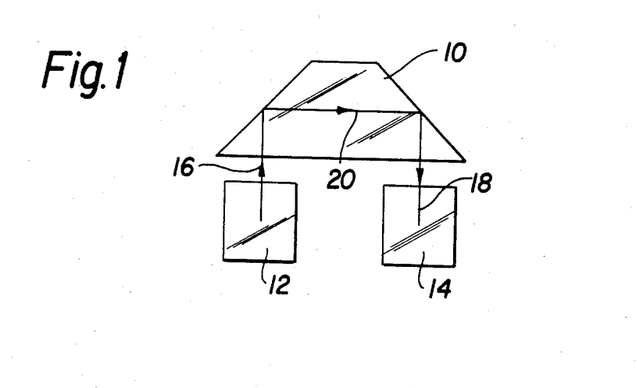
FIG. 1 shows a side view in the normal position of the optical path system for erecting the image, as used in a particular illustrative embodiment of the invention.

A trapezoidal prism 10 and two half-cube prisms 12 and 14 are depicted in FIG. 1. The exit optical axis 16 of the half-cube prism 12 runs parallel to the entry optical axis 18 of the half-cube prism 14. The half-cube prisms 12 and 14 can be rotated about the optical axes 16 and 18, and constitute the first and second optical components. It is also possible, in principle, for these components to take a different form. It is thus possible for a plurality of reflections to take place in the optical components, and the angle between the entry and exit optical axes can also assume values differing from 90°. It would also be possible to use mirrors in place of prisms. Similar considerations apply in the case of the optical bridge, which, in this particular case, is the trapezoidal prism 10. Here, too, more than two reflections could, in theory, occur, which could also be provided for with the aid of mirrors. Furthermore, it is not essential for the optical axis 20 of the optical bridge to be located perpendicularly to the exit optical axis of the first component 12 and perpendicularly to the entry optical axis 18 of the second component 14.

Figure 2:
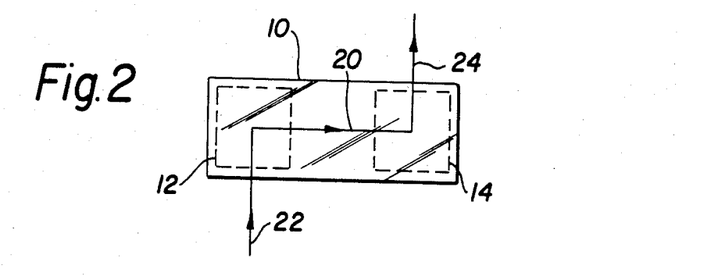
FIG. 2 shows a plan view of the optical path system in the position shown in FIG. 1.

The normal position of this optical path system is particularly clearly evident from FIG. 2. From this Figure, it can readily be seen that the entry optical axis 22 of the first optical component 12, on one side of the optical bridge 10, is perpendicular to the optical axis 20 of the bridge 10, and the exit optical axis 24 of the second optical component 14, on the opposite side of the optical bridge, is likewise perpendicular to the optical axis of the bridge.

Figure 3:
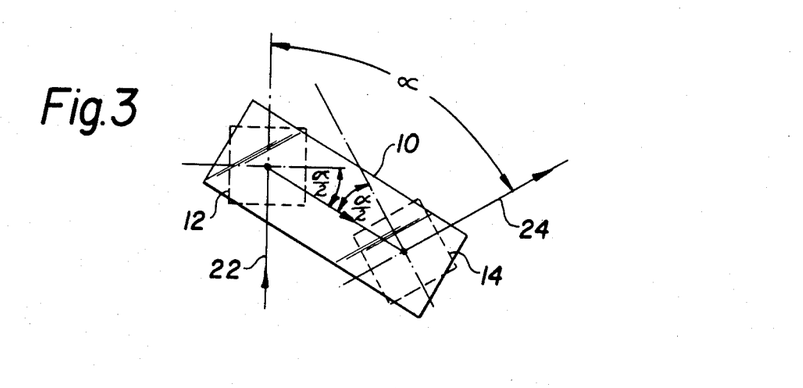
FIG. 3 shows a plan view of the optical path system, in a position which has been rotated out of the position shown in FIG. 1.

FIG. 3 illustrates a position differing from the normal position shown in FIGS. 1 and 2. From FIG. 3, it can be appreciated that, starting from the normal positions of the optical components 12 and 14 about their respective axes 16 and 18, as shown in FIGS. 1 and 2, the angle $\alpha/2$ of the first optical component 12 about its exit optical axis 16 is equal to the angle $\alpha/2$ of the second optical component 14 about its entry optical axis, but in the opposite sense to this angle. The overall result is then that a rotation, through an angle $\alpha$, occurs between the entry axis 22 and the exit axis 24 of the optical path system.

Figure 4:
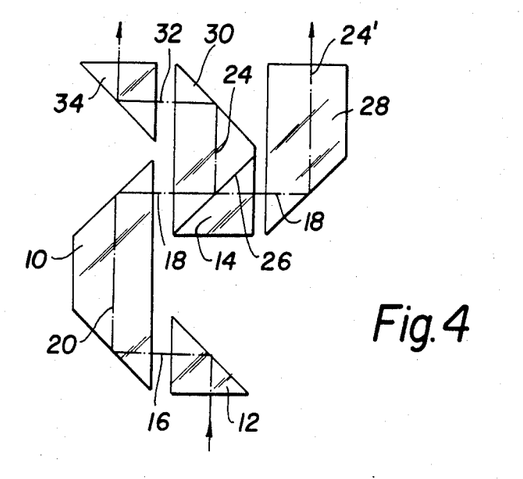
FIG. 4 shows, diagrammatically, a front view of the essential optical parts of a microscope possessing the optical path system according to FIGS. 1 to 3.

In FIG. 4, the optical path system which has just been described is shown in conjunction with a microscope, the prism 14 now being a splitting prism which splits the beam emerging from the optical bridge 10 along the optical axis 18, splitting taking place at the surface 26. At the splitting surface 26, a portion of the beam is diverted along the optical axis 24, while the other portion of the beam passes along the optical axis 18, that is to say through the splitting surface, without being reflected at it. It is not reflected upwards until inside the prism 28 in that tube of the binocular unit which is shown on the right in FIG. 4, the beam running along an axis 24' which is parallel to the optical axis 24. A half-cube prism 30 adjoins the splitting prism 14, with which it can be combined in a one-piece design. The prism 30 diverts the beam along the exit optical axis 24 towards the optical axis 32, this latter axis being at the same time the entry axis of a half-cube prism 34 which deflects the beam upwards, and which is assigned, in FIG. 4, to the left-hand tube of the binocular unit. In the upward direction, the prisms 28 and 34 are further followed by the eyepieces of the tubes, while the microscope objective would be positioned beneath the prism 12. The binocular unit is formed essentially by the prisms 14, 28, 30 and 34, it being conspicuous that, in contrast to the prior art, this binocular unit has a lateral energy.

The splitting prism 14 preferably splits the beams in the ratio 50:50.

In contrast to a bent tube, in which the two tubes of binocular unit (prisms 28 and 34) would have been capable of swinging about the optical axis 24 in order to be adjustable to suit the observer's eye-spacing, the present description relates to a so-called draw-tube, in which the two tubes (see prisms 28 and 34) can be shifted in the plane of the drawing in order to permit adjustment to suit the eye-spacing of the observer.

If the optical path system according to FIGS. 1 to 3 were to be combined with the binocular unit in the conventional manner, the beam which, in FIG. 4, points away from the splitting surface 26 towards the left, would point downward and would enter a further half-cube prism which would be the second optical component of the optical path system. Correspondingly, the optical bridge 10 and the first optical component 12 would also be located at a lower level, by a distance at least equal to the size of the additional half-cube prism.

Figure 5:
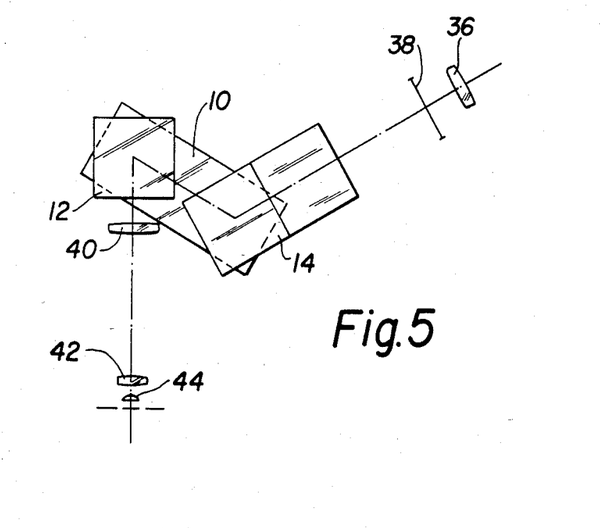
FIG. 5 shows, diagrammatically, a side view of the microscope shown in FIG. 4.
Figure 6A:
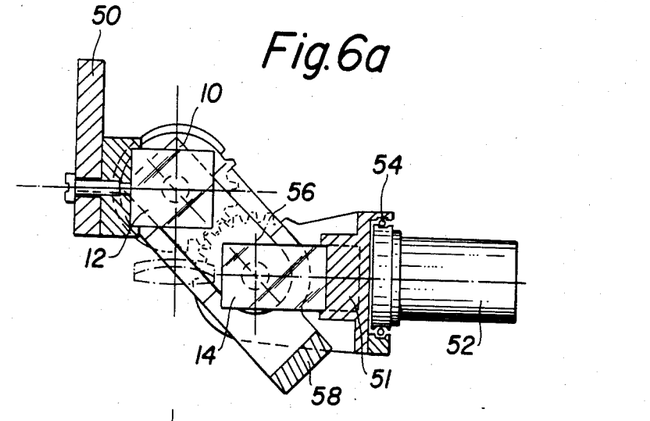
FIGS. 6a and 6b show vertical partial sections through the microscope, in order to illustrate the mechanism, on the one hand with the binocular unit aligned horizontally, and on the other hand with the binocular unit aligned vertically.
Figure 6B:
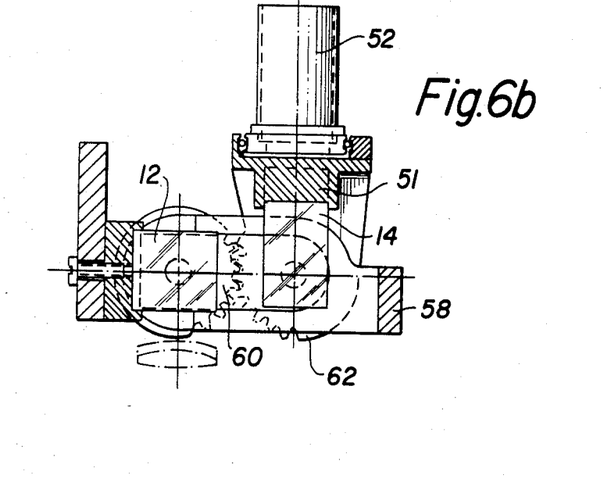
Figure 7A:
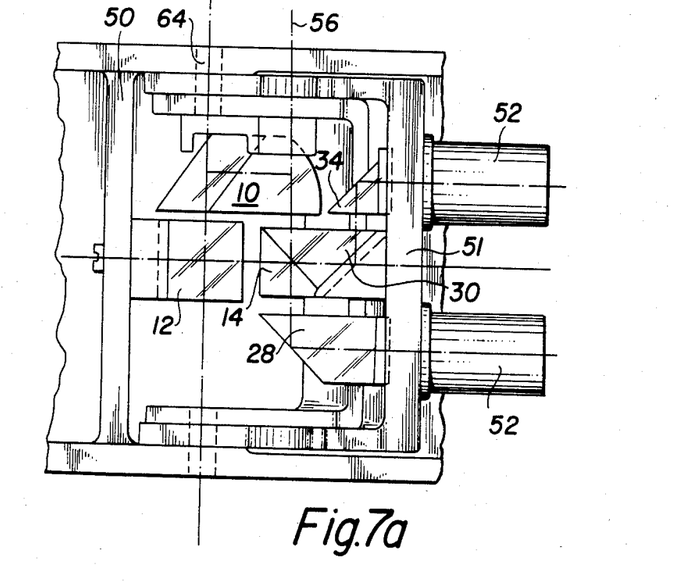
FIGS. 7a and 7b show a plan view which is related to FIG. 6a and a horizontal section which is related to FIG. 6b.
Figure 7B:
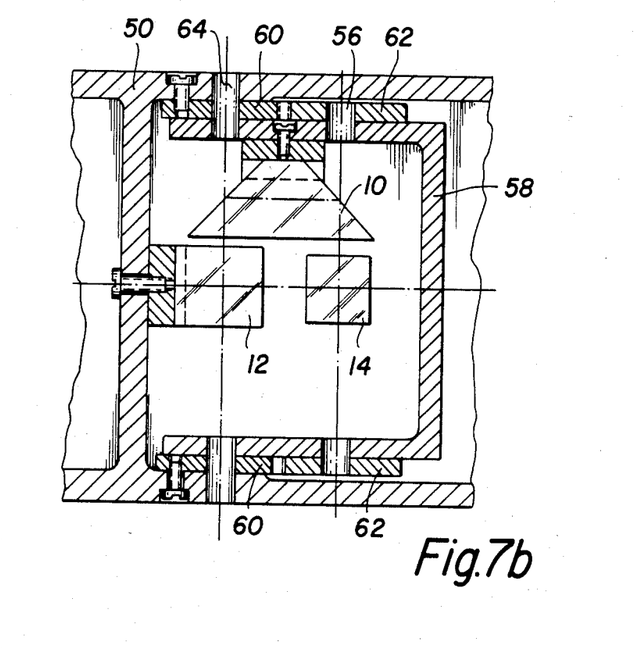

In the side view shown in FIG. 5 there is shown only one of the eyepieces, this eyepiece bearing the reference number 36, together with an intermediate image 38 which is viewed by means of the eyepiece, and a tube lens 40 for correcting the microscope objective 42, by means of which the object 44 is viewed, to "infinity."

Reference is now made to FIGS. 6a to 7b. These figures show vertical partial sections through the microscope in the two extreme positions, which, however, are never assumed under reasonable conditions, together with a plan view and a section in a horizontal plane. The first half-cube prism 12 of the optical path system is fastened to the microscope housing 50. The second half-cube prism, or splitting prism, 14, is connected to the tubes 52 of the binocular unit by means of a U-shaped holder 51. In order to adjust their separation to suit an observer's eye-spacing, the tubes 52 are movably mounted in bearings 54 (see FIG. 6a). The U-shaped holder 51 is mounted so that it is pivotable about an axis 56 which coincides with the optical axis 18. The trapezoidal prism forming the optical bridge 10 is fastened, as shown particularly in FIG. 7b, to a further U-shaped holder 58, which can be pivoted about the axis 64. A gearwheel 60 is located between the housing 50 and the holder 58, on each side of the latter. The gearwheel 60 is immovably installed on the housing, coaxial with the axis 64, and meshing, on each side, with a gearwheel 62 which is integrally formed on each open end of the limbs of the U-shaped holder 51. The gearwheel 62 is fastened to the U-shaped holder 58 in a manner permitting rotation about the axis 56, this latter axis being coaxial with the optical axis 18. The holder 58 can therefore be swung about the shaft 64, which is immovably attached to the housing, whereupon the trapezoidal prism 10 is turned about the optical axis 16. The holder 51, carrying the tubes 52, is swung about the axis 56, which moves relative to the housing 50, but which is stationary with respect to the holder 58. During this movement the prism 14 is rotated on the optical axis 18. At the same time, the gearwheels ensure that the binocular-unit tube 52 moves, relative to the optical bridge 10, through an angle which is double the angle through which the prism 14 move, thus perfectly satisfying the requirement that rotation of the image should be prevented.

Figure 8:
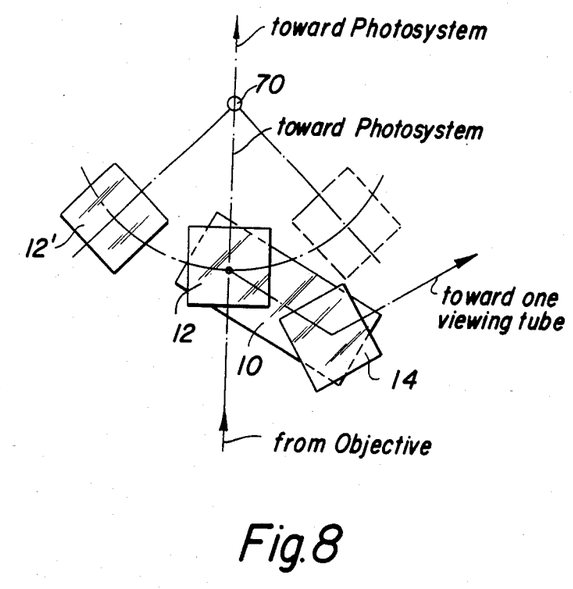
FIG. 8 shows, diagrammatically, a side view of a portion of a microscope, in which the prism 12 can be interchanged in accordance with the invention.

FIG. 8 now shows diagrammatically a side view of a portion of microscope similar to the view shown in FIG. 5, in which microscope however the prism 12 is interchangeable in accordance with the invention. The half-cube prism 12, in which complete reflection or deflection takes place, can be swung about an axis of rotation 70 about which a second half-cube prism 12' can also be swung. The half-cube prism 12' is a splitting prism, and if it replaces the prism 12 in the optical path system, 80%, for example, of the light coming from the objective is reflected or, as the case may be, deflected into the optical bridge 10, while 20% of this light through, unimpeded, to a photographic system. In order to bring the splitting prism 12' into the position of the half-cube prism 12, the assembly consisting of the splitting prism 12' and the prism 12 must be swung about the axis of rotation 70, in a clockwise direction. After this movement, the splitting prism 12' is located at the position of the prism 12, in FIG. 8, and the prism 12 is located in the position indicated by a broken line. As FIG. 8 clearly shows, this procedure enables the first optical component to be changed, while, if the prism were to be interchanged by means of a linear shifting movement, the position of the second optical component 14 could make it impossible to change the first optical components. A vertical shifting movement is always inappropriate, since it would lie in the optical path, and additionally, the tube lens, which is not shown, is located beneath the prism 12.

Although FIG. 8 immediately shows that the inclination of the viewing tube cannot exceed an angle of 45° by any significant amount, a pivoting range of 15% to 45° is nevertheless sufficient in actual practice.

Figure 9A:
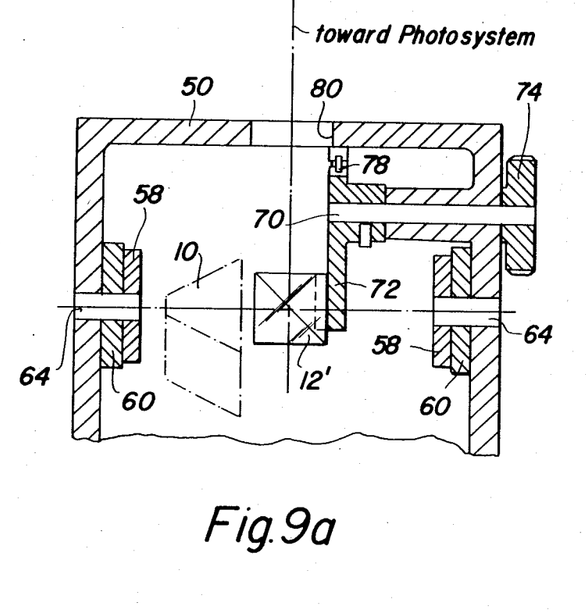
Figure 9B:
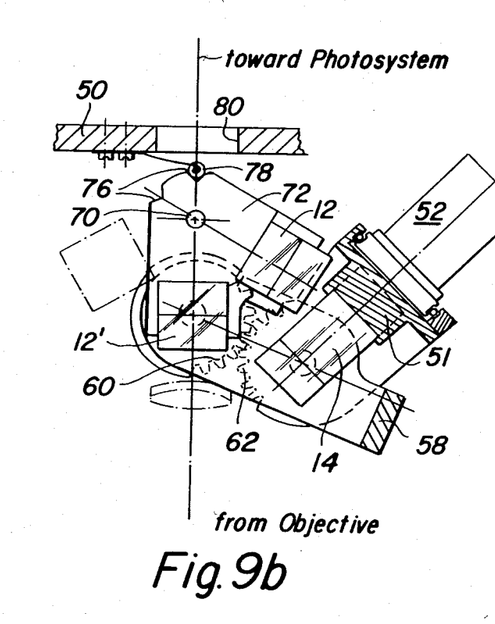

FIGS. 9a and 9b represent two mutually perpendicular sections through a portion of a specific illustrative embodiment of a microscope according to FIG. 8. With the exception of the interchangeability of the prism 12, and the limitation of the inclination of the viewing tube resulting from this interchangeability, this microscope is identical to that shown in FIGS. 6a to 7b. Two half-cube prisms 12 and 12' are fastened to a holder 72, at the same distance from the axis of rotation 70. The holder 72 can be swung about the axis 70, from the outside, with the aid of a rotatable knob 74, and can assume two angular positions which are defined by indexing recesses 76 in the holder 72 which can be engaged by a roller 78 which is resiliently fastened to the housing 50. In one of the angular positions, the half-cube prism 12', which is designed as a splitting prism, is located in the optical path of the microscope, while in the other angular position this prism is located outside the optical path (position drawn with a broken line) and the totally reflecting prism 12 is located in the optical path of the microscope. When the splitting prism 12' is located in the optical in the optical path of the microscope, as shown in FIGS. 9a and 9b, the beam from the objective is split into a beam to the photographic system and a viewing beam which subsequently enters the viewing tube 52, this being accomplished by way of the erecting path system. At the same time, the beam to the photographic system passes through an opening 80 in the housing 50.

It should be understood that it is also possible to employ only a single tube as the viewing tube in a microscope conforming to FIGS. 8 and 9b, instead of the two tubes in the embodiments described above.

I claim:

1. A microscope having a housing, an inclinable eyepiece assembly, vertical observation axis, and an optical system for delivering all light from the observation axis to the eyepiece or alternatively some to the eyepiece and some to a photographic system, which comprises a holder mounted in said housing, said holder being selectively movable between first and second positions, a first optical means carried by said holder, said first optical means being adapted to divert all light from the vertical observation axis to a stationary horizontal axis when said holder is in said first position;

a second optical means carried by said holder, said second optical means being adapted to divert some light from the vertical observation axis to said stationary horizontal axis when said holder is in said second position and permit the remaining light to pass to the photographic system;

an optical bridge for receiving light on said stationary horizontal axis, said optical bridge being pivotably connected to said housing for rotation about a pivot axis coincident with said stationary horizontal said optical bridge exiting light along a movable horizontal axis, said movable horizontal axis being spaced from and parallel to said stationary axis, and a pivotable optical means for diverting light received along the movable horizontal axis toward the eyepiece, whereby all light is diverted toward the eyepiece, when the holder is in the first position and, when the holder is in the second position, some light is diverted toward the eyepiece.

2. The microscope according to claim 1 wherein said holder is rotatable.

3. The microscope according to claim 1 wherein said second optical means is a beamsplitter.

4. The microscope according to claim 3 wherein said beamsplitter divides the light 80%/20%.

* * * * *